3,504,963
FLAME-SPRAYED ALUMINUM OXIDE REFLECTIVE COATING
John M. Davies, Cochituate, and Walter Zagieboylo, Norfolk, Mass., assignors to the United States of America as represented by the Secretary of the Army
Continuation of application Ser. No. 406,626, Oct. 26, 1964. This application June 19, 1969, Ser. No. 842,768
Int. Cl. G02b 1/00
U.S. Cl. 350—321                                    6 Claims

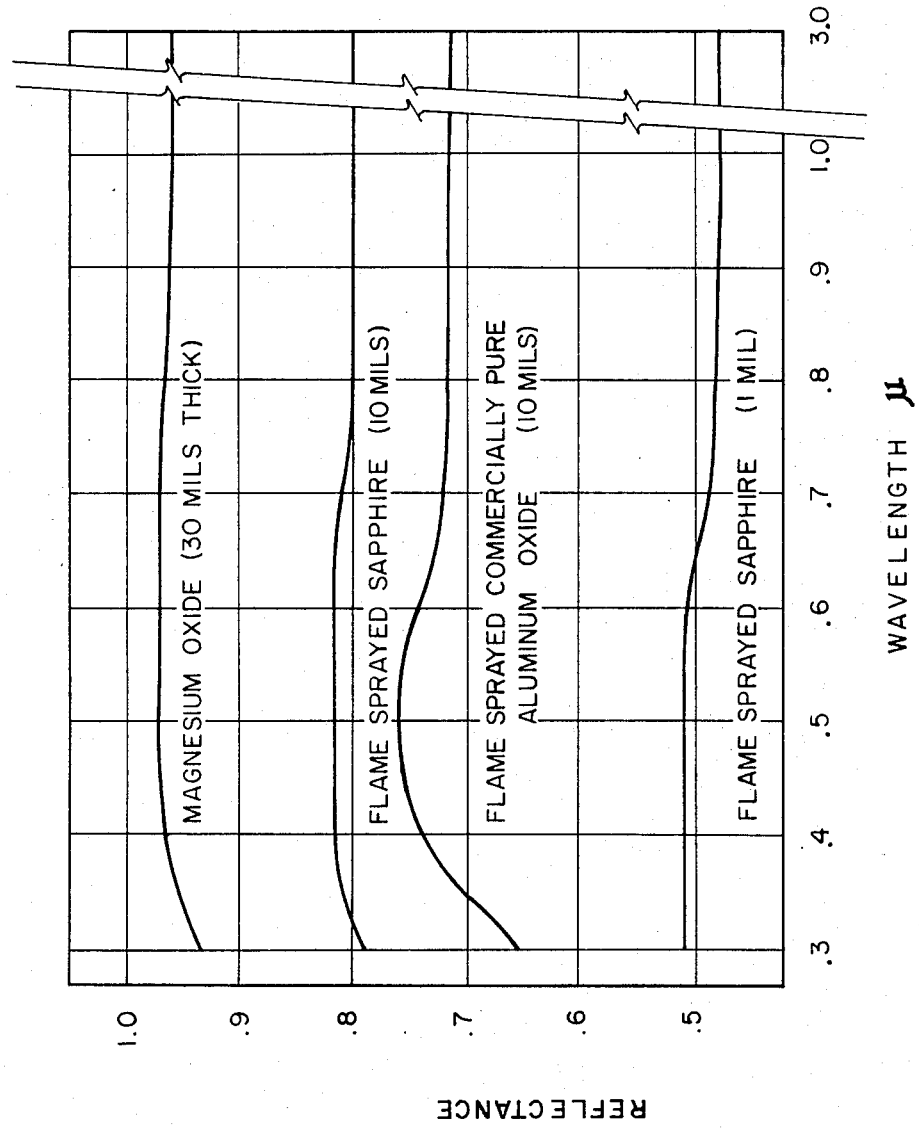

ABSTRACT OF THE DISCLOSURE

A hard, durable, diffuse reflecting surface or coating produced by flame spraying a synthetic sapphire (a pure mono-crystal of aluminum oxide) on a surface, said coating having a reflectance that deviates less than 4% over the wavelength range of from 0.3 to 3.0 microns. This is a continuation of Ser. No. 406,626, filed Oct. 26, 1964, now abandoned.

---

The invention described herein may be manufactured and used by or for the Government for governmental purposes without the payment to us of any royalty thereon.

This invention relates to diffuse reflecting surfaces and reflecting coatings and more particularly to a flame-sprayed coating of aluminum oxide which approaches the ideal of a perfectly diffuse reflectance, and having a reflectance that deviates less than 4% over the wavelength range of from 0.3 to 3.0 microns.

In the measurement of the ability of various materials to reflect and transmit light, especially when the reflected or transmitted radiation is diffuse, it is common practice to use an integrating sphere as a component of the photometric system. Light reflected from or transmitted through the sample under measurement impinges on the inner reflective surface of the sphere, uniformly brightening the whole sphere. The brightness of an area of the inner surface is then detected with a suitable device, as for example, a photocell or blackened thermocouple.

The requirements for the inner surface of such a sphere are, the ability to scatter light diffusely, approaching the perfect case of uniform distribution of reflected energy regardless of the direction of the incident beam, and the ability to reflect substantially uniformly at all wavelengths of interest and with sufficient intensity to permit proper operation of the detecting system. To meet these requirements, it has long been the practice to line the inner surface of integrating spheres with a coating of magnesium oxide, which is created by burning a ribbon of magnesium and allowing the white oxide smoke to coat the sphere. Such coatings have good diffusing properties, high absolute reflectance, and reflectance that is fairly constant with respect to wavelength in the range of from 0.4 to 3.0 microns. On the other hand, while long employed for this purpose, and in fact presently used as a reflectance standard, magnesium oxide reflective coatings have several rather serious drawbacks in that they are not durable mechanically with the result that any blow transmitted to a surface so coated generally results in some loss of the powdery coating, they exhibit some variation in reflectivity with wavelength and the reflectance of such coatings is not constant, diminishing with age. Also, the high value of average reflection is shown to be a disadvantage in some cases.

Typically, reflected radiation is measured as a function of wavelength but very often in using reflectance and transmittance data, it is desirable to obtain an effective average reflectivity or transmissivity. Such average values of course will depend on the wavelength distribution of the radiation source. To obtain these averages, it is necessary to integrate the reflectivity or transmissivity properly weighted at the various wavelengths, that is, multiply the incident power at each wavelength by reflectivity (or transmissivity) at that wavelength and average the results over the wavelength range. Such a procedure is time-consuming and of questionable accuracy since the wavelength distribution of the various light sources are not well known. A single direct measurement of the correctly weighted average reflectivity (or transmissivity) values, on the other hand, may be obtained by measuring the total energy reflected or transmitted for a given source rather than using small wavelength intervals. For this type of measurement, however, the requirements of the sphere coating are somewhat more stringent in that the coating must reflect the energy at all wavelengths of interest equally. For measurements wherein the source is the sun or a carbon arc a constancy of reflection within the range of 0.35 to 2.5 microns and preferably from 0.3 to 3.0 microns is necessary.

We have discovered a reflective coating that meets these stringent requirements which is hard and durable as contrasted with the soft powdery magnesium oxide coating, approaches perfection in the diffuseness of the reflected light, can be adjusted to give a range of reflectivity from 50% to 80% of the incident light and exhibits a reflectance curve that shows very little variation over the spectral range of interest. This reflective coating is obtained by flame spraying synthetic sapphire rods. Such rods, which are pure monocrystals of aluminum oxide, are formed by the Verneuil process wherein crystallizable aluminum oxide powder passes through an oxyhydrogen flame fusing the powder which collects on a support containing a crystal seed and in cooling grows to form a large single crystal. The preparation of such synthetic sapphires is well known, e.g., see U.S. Patent No. 2,852,890. The fact that a flame sprayed sapphire coating reflects uniformly over the spectral range of from 0.3 to 3.0 microns is somewhat surprising since flame sprayed commercially pure aluminum oxide either as a powder or a resin bonded rod exhibit significant variation in spectral response which is most severe in the near ultraviolet range with the result that such a coating would be unsuitable for making measurements of correctly weighted average reflectivity or transmissivity. The reasons for this substantial difference in reflective properties are not clear but it has been observed that flame sprayed sapphire results in a denser coating than the commercially pure aluminum oxide. The latter material can be flame sprayed at a lower temperature than the sapphire and this may in some way contribute to the difference in properties. In addition, it is possible that the trace of impurity found in commercially pure aluminum oxide also contributes to its spectral aberration.

Accordingly, it is among the objects of the present invention to provide a reflective coating which approaches the ideal of perfect diffusivity.

Another object is to provide a reflective coating that reflects substantially uniformly over the spectral range of from 0.3 to 3.0 microns.

Another object is to obtain a reflective coating which is durable, constant with age and can be varied to reflect from 50% to 80% of the incident light.

Other objects and advantages will appear from the following description taken together with the accompanying drawing wherein:

FIGURE 1 is a chart bearing curves which illustrate the reflectance of magnesium oxide, flame-sprayed commercially pure aluminum oxide, and flame-sprayed synthetic sapphire coatings over the wave length range of 0.3 to 3.0 microns.

The aluminum oxide coating of the present invention is obtained by flame-spraying a synthetic sapphire, i.e., a pure mono-crystal of aluminum oxide on a suitable base or surface. Synthetic sapphires are available from many commercial sources and the technique of forming such pure crystals, as previously noted, is well known. Flame-spraying is a technique whereby a rod of the material which is to form the coating is fed into a high temperature blast of gas which fuses, atomizes and sprays the molten material. Flame-spraying of metal oxides is described in British patent specification No. 745,257 to Norton Grinding Wheel Co., Ltd.

The principles of our invention will now be more fully described in connection with the coating of the inner surface of an aluminum integrating sphere. Such a sphere, consisting of two matching hemispherical sections is lightly sandblasted to roughen the inner surface to improve adhesion of the flame-sprayed coating material. A synthetic sapphire rod, having a diameter of 0.3 cm., is fed into an oxy-acetylene flame in a device such as that shown in British Patent No. 745,257. The amount of oxygen fed into the flame is gradually increased until a temperature is reached at which the sapphire rod begins to spray molten material. Preheating the aluminum hemispheres slightly facilitates adhesion of the coating material. The flame-sprayed molten oxide is then directed against the object to be coated. If the object is too close or too far from the source of molten oxide, the latter will not adhere to the former. In order not to burn the object being treated, the flame-spraying device is held some distance from the object and gradually brought closer thereto until the flame-sprayed oxide is seen to adhere to the surface to be treated. Coating thickness can be varied within wide limits but for an integrating sphere it is preferably in the range of 1 to 10 mils. The thickness of the coating will be determined by the length of time a surface is exposed to the flame-sprayed material. The coating thus obtained is very hard and dense, and tightly adherent to the substrate.

The diffuse reflectance of a sphere coated as described above was measured and compared with spheres coated with freshly prepared magnesium oxide and flame-sprayed commercially pure aluminum oxide. Diffuse reflectance was measured with a goniophotometer (described in U.S. National Bureau of Standards Circular 429, July 1952), employing a tungsten filament lamp as a source and a barrier layer photocell as a detector. The results for magnesium oxide, flame-sprayed commercially pure aluminum oxide and synthetic sapphire coatings were found to approach an ideal diffuse reflector.

The diffuse reflectance of the same three coating materials was determined for the wave length range 0.3 to 3.0 microns. Measurements were made with a spectrophotometer and the values given were measured relative to magnesium oxide but are expressed in absolute terms. The results are shown in FIGURE 1. The magnesium oxide curve shows a decrease in reflectance of about 4% at 0.3 microns which becomes greater on aging. The sprayed sapphire curve is at least as flat as MgO and is permanent and stable. The commercially pure aluminum oxide, on the other hand, demonstrated considerable variation in reflectance along with a large decrease in the ultraviolet.

The effect of coating thickness of the flame-sprayed sapphire coating on reflectance values was determined over the same wave length spectrum. Average reflectance values varied from a low of 50% for the thinnest (1 mil) to a high of 80% for the thickest coating (at least 10 mils). This ability to vary reflectance with thickness of coating is of some value since the reduction in average reflectance of the sphere reduces the amplification of the error caused by non-uniform reflectance. Expressed differently, the 4% reflection variation in the ultraviolet region of MgO over the average reflection of about 96% will result in a larger error than a 4% reflection variation over any lesser average reflection. If the variation in reflectance over the spectrum is the same, then a reduction in average reflectance reduces the error in the brightness reading since the brightness is proportional to the ratio $$\frac{1}{1-R}$$

where R is the average reflectance of the coating.

In addition to use as a coating for the inner reflective surface of an integrating sphere, the high reflectance, durability and relatively high thermal conductivity of flame-sprayed sapphire coatings are singularly suited for coating calorimeters, radiometers and optical monitors which are exposed to intense light radiation as from solar furnaces and lasers. This coating can also be used as a permanent optical standard. In this case having known average reflectances over a range of 50% to 80% is an advantage.

Thermal radiation sensing devices and, in particular, calorimeters for measuring thermal radiation have surfaces designed to absorb definite fractions of the incident radiation. For sensitive devices for measuring low levels of radiation, the surface is usually black to absorb a large fraction of the incident radiation whereas for intense radiation, the sensitivity can be adequate with surfaces which reflect more and absorb less radiation. There are two requirements for such surfaces; (1) they must be stable in that they can withstand the high temperatures attained by the body asborbing the radiation with no change in reflectance and (2) the reflectance should be constant over the wave length of interest.

In the measurement of the thermal radiation of a solar furnace we have heretofore employed copper disks having a thermocouple soldered to the back surface and having the front surface coated with electrolytically deposited carbon black or camphor smoke. Such coatings absorb energy independent of wave length but, at intensities above 20 cal. cm.$^{-2}$, the temperature generated burns off the coating and melts the solder connection unless very short exposures are used. Coating the front surface of the calorimeter with flame-sprayed aluminum oxide in the manner heretofore described results in a surface which will absorb energy independent of wave length and will also withstand intensities as high as 100 cal. cm.$^{-2}$ since the surface will reflect as much as 4/5 of the incident energy. Longer exposures can be made and, in particular, the same exposures can be used as are needed for checking on tests or experiments in question.

This invention described in detail in the foregoing specification is subject to changes and modifications without departing from the principle and spirit thereof. The terminology used is for the purpose of description and not of limitation, the scope of the invention being defined in the claims.

We claim:

1. A light reflective surface consisting of a base and a light reflective aluminum oxide coating on said base, said aluminum oxide coating formed by flame-spraying a synthetic sapphire crystal rod on said base, said aluminum oxide coating being characterized by its ability to reflect light diffusely and by having a reflectance which varies less than 4% over the spectral range of 0.3 to 3.0 microns.

2. A light reflective surface according to claim 1 wherein said base is metal, the thickness of said coating is at least one mil and wherein the reflectance of said coating is constant with said age.

3. A light reflective surface according to claim 2 wherein the range of reflectivity of the incident light ranges from 50% to 80% according to the thickness of the coating.

4. An integrating sphere having its interior surface covered with a durable, reflective coating of aluminum oxide, said coating formed by flame-spraying a synthetic sapphire crystal rod on the interior surface of said sphere, said aluminum oxide coating having the property of reflecting light diffusely and having a reflectance of less than 4% over the spectral range of 0.3 to 3.0 microns.

5. A light reflective surface according to claim 4 wherein the thickness of the reflective coating is at least one mil and the reflectance of the coating is constant with age.

6. A light reflective surface according to claim 5 wherein the reflective coating reflects from 50% to 80% of the incident light.

References Cited

UNITED STATES PATENTS

| | | |
|---|---|---|
| 2,585,128 | 2/1952 | Howe et al. |
| 3,310,423 | 3/1967 | Ingham. |

FOREIGN PATENTS

| | | |
|---|---|---|
| 440,287 | 12/1935 | Great Britain. |
| 745,257 | 2/1956 | Great Britain. |
| 852,484 | 10/1960 | Great Britain. |

DAVID SCHONBERG, Primary Examiner

TOBY H. KUSMER, Assistant Examiner

U.S. Cl. X.R.

117—35, 105.2; 250—228; 350—290